United States Patent
Bevot et al.

(10) Patent No.: US 9,423,792 B2
(45) Date of Patent: Aug. 23, 2016

(54) METHOD FOR SUPPRESSING INTERFERENCE

(75) Inventors: Claudius Bevot, Stuttgart (DE); Thomas Steinert, Weinstadt (DE); Thomas Schulz, Bietigheim-Bissingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 332 days.

(21) Appl. No.: 13/294,534

(22) Filed: Nov. 11, 2011

(65) Prior Publication Data

US 2012/0126882 A1 May 24, 2012

(30) Foreign Application Priority Data

Nov. 18, 2010 (DE) .......................... 10 2010 044 142

(51) Int. Cl.
*G05B 13/02* (2006.01)
*G05B 21/02* (2006.01)
*F02D 41/14* (2006.01)

(52) U.S. Cl.
CPC ............ *G05B 21/02* (2013.01); *F02D 41/1401* (2013.01); *F02D 41/1455* (2013.01); *F02D 41/1477* (2013.01); *F02D 41/1486* (2013.01)

(58) Field of Classification Search
CPC ............ F02D 41/1456; F02D 41/1495; F02D 41/222; F02D 41/1448; F02D 41/1454; F02D 41/1493
USPC ............... 700/55, 254; 73/23.21, 1.06, 23.31; 219/497
See application file for complete search history.

(56) References Cited

U.S. PATENT DOCUMENTS

| | | | | |
|---|---|---|---|---|
| 4,915,813 A * | 4/1990 | Nakajima | ............ | G01N 27/417 123/693 |
| 5,394,341 A * | 2/1995 | Kepner | ......................... | 702/183 |
| 6,136,170 A * | 10/2000 | Inoue | ................. | G01N 27/4065 204/408 |
| 6,301,878 B1 * | 10/2001 | Zhang | ................. | F02D 41/1441 204/425 |
| 2003/0178303 A1 * | 9/2003 | Bolz | ............................. | 204/406 |
| 2006/0155490 A1 * | 7/2006 | Ingrisch et al. | ................. | 702/69 |
| 2009/0133464 A1 * | 5/2009 | Sell | ....................... | F02D 41/064 73/1.03 |
| 2010/0011597 A1 * | 1/2010 | Bo et al. | .......................... | 30/381 |
| 2011/0005202 A1 * | 1/2011 | Gady et al. | ...................... | 60/276 |
| 2011/0153035 A1 | 6/2011 | Grichnik et al. | | |

FOREIGN PATENT DOCUMENTS

| | | |
|---|---|---|
| CN | 101379739 | 3/2009 |
| CN | 201444574 | 4/2010 |
| CN | 101834554 | 9/2010 |
| JP | S62171349 A | 7/1987 |
| JP | 01076536 U | 5/1989 |
| JP | H10-312201 A | 11/1998 |
| JP | 2001317400 A | 11/2001 |
| JP | 2009002280 A | 1/2009 |
| JP | 2009250029 A | 10/2009 |

\* cited by examiner

*Primary Examiner* — Darrin Dunn
(74) *Attorney, Agent, or Firm* — Norton Rose Fulbright US LLP

(57) ABSTRACT

In a method for suppressing interference in a controlled variable in a control circuit, in which the actuating variable is the useful signal, the controlled variable is detected continuously, at two successive sampling instants in each case, the values of the controlled variable are subtracted, and if the absolute amount of the difference deviates by a predefinable setpoint value, at least one control parameter is modified, in such a way that the response of the actuating variable to the interference is minimized.

7 Claims, No Drawings

METHOD FOR SUPPRESSING INTERFERENCE

FIELD OF THE INVENTION

The present invention relates to a method for suppressing interference in a controlled variable in a control circuit, in which the actuating variable is the useful signal.

BACKGROUND INFORMATION

Such control circuits are used in the most varied technological fields. They are utilized in particular in automotive technology. The removal of toxic substances in the exhaust gas of internal combustion engines, for example, is based on control circuits such as a controlled Lambda probe, in which the actuating variable, i.e., the pump current, represents the useful signal. The controlled variable, on the other hand, is the Nernst voltage, which is adjusted to a predefined value (450 mV). If this value of the Nernst voltage has been reached, the exhaust gas has a value of Lambda=1. The Lambda value is determined via the actuating variable, i.e., the pump current, in a manner that is known per se. Interference which influences the control may arise in such a control circuit, it specifically being the case that the controlled variable, that is to say, the Nernst voltage in the case of a Lambda probe, is adversely affected as well. For example, an interference quantity which is not related to the useful signal or the controlled variable, may be coupled in, e.g., via the connecting lead such as in a cable tree. Such a coupling can result from interference, which is produced by piezo injectors in Diesel engines, for instance, or it may be created in some other manner or possibly simply be due to the effects of EMC interference.

Such interference is characterized, for example, by a faster signal rise or drop time in comparison with the controlled variable, so that the interference is changing more rapidly per time unit than the controlled variable itself. In a control circuit such interference is not readily distinguishable from a control deviation. It may therefore cause a change in the actuating variable, and thus have a negative effect on the useful signal, that is to say, falsify the signal. Essentially three measures are known from the related art for removing such interference-causing influences. For one, the useful signal is filtered. Such filtering reduces the fault of the useful signal resulting from the coupled interference. A second measure is filtering of the controlled variable. This reduces the amplitude of the interference variable. Finally, extreme slowing of the control circuit is an option as well, e.g., by a lower P-component of the control characteristic. A disadvantage of these conventional methods is that damping of the interference is invariably accompanied by damping of the useful signal, or by a loss of dynamics of the useful signal.

Therefore, the present invention is based on the objective of further developing a method for suppressing interference in a controlled variable of the type described above, in such a way that interference is not only able to be identified, but the interference is suppressed and minimized in such a way that the effect on the useful signal is minimal and the dynamics of the interference-free useful signal are retained, if possible.

SUMMARY OF THE INVENTION

This objective is achieved by a method for suppressing interference in a controlled variable in a control circuit of the type described at the outset, in that the controlled variable is detected continuously, at two successive sampling instants in each case, the values of the controlled variable are subtracted, and in the event that the absolute amount of the difference deviates by a predefinable setpoint value, at least one control parameter is modified, such that the response of the controlled variable to the interference is minimized. A core idea of the present invention thus is to monitor the temporal development of the controlled variable and to monitor and plausibilize the changes so to speak, by comparing them with a predefinable setpoint variable. The continuous monitoring of the controlled variable is performed in an ongoing manner, at two successive points in time in each case. If a change is detected, the control parameters are modified, so that a change in the controlled variable occurs at the subsequent monitoring instants. This ensures that the control circuit does not respond to the undesired interference.

The present invention distinguishes between control variable and control parameter. In the following text, a control variable denotes the variable to be adjusted, that is to say, the Nernst voltage in the case of a Lambda probe, whereas the term control parameter denotes parameters of the controller, such as the P-component, the I-component or the D-component in a PID controller, for instance, or the control rate or the like.

One advantageous further development of the method provides that the useful signal, i.e., the actuating variable, is not used during the modification of the at least one control parameter, and/or is identified as not usable. This is based on the idea that, once interference has been detected and the actuating variable, i.e., the useful signal, is falsified as well, it must not be used. This also applies during the modification of the control parameters.

In one advantageous development of the method, all control parameters are then reset to their initial values.

In another development, the amplification in the control circuit is reduced. The two latter variants are of course also combinable.

It is especially preferred if the comparison of the controlled variable with the external setpoint variable takes place at definable, time-discrete intervals. This makes it possible to dispense with continuous monitoring; instead, the comparison takes place only intermittently. This increases the processing rate since the computation time is reduced if the controller is implemented as a software program.

In a very advantageous manner, the method is able to be realized as a computer program and may run on a computer such as a control unit of an internal combustion engine. In this context, a computer program product having program code may be provided, which code is stored on a machine-readable medium. This makes it possible to virtually "import" the program into existing control units as well and to provide corresponding expansions in existing systems in this regard.

DETAILED DESCRIPTION

In a control circuit known per se, e.g., a Lambda probe, the pump current is the actuating variable or the useful signal. The controlled variable, on the other hand, is the tapped Nernst voltage of the probe, which is compared in a comparator with a predefined value, e.g., 450 mV. The pump current is regulated as a function of this comparison, i.e., in such a way that the deviation vanishes. In this case the exhaust gas has an air ratio of Lambda=1. The pump current as a useful signal is a measure for the Lambda value of the exhaust gas. Via connecting leads, e.g., via the cable tree, it is then possible that interference variables which are not related to the useful signal or the controlled variable, e.g., result from electromagnetic couplings such as produced by a piezo injector in a Diesel combustion engine, are coupled into the controlled variable and into the controlled variable as well. Such interference is characterized by a faster signal rise or signal drop time than in the controlled variable, and thus changes more rapidly per time unit than the controlled variable. In such a case a control circuit as it is generally known and used for the Lambda probe, for instance, is unable to distinguish between the interference and a control deviation. In response to the interference, a change in the actuating variable and thus in the useful signal thus results, which has a negative effect, i.e., causes a falsification of the useful signal.

In order to exclude falsifications of this type, the present invention provides for an in particular digital control circuit for the sensor operation, e.g., a broad-band Lambda probe, in an engine control device, which is made up of an arithmetic logic unit, for example, and which samples and records the controlled variable at successive sampling instants in a continuous manner, forms the difference of the two detected controlled variables and then compares the absolute value of the difference with a stored and predefined setpoint quantity. The setpoint quantity is predefined in such a way that it reflects a change in the controlled variable in an interference-free control circuit. The setpoint quantity is determined with the aid of a comparable control circuit exhibiting no interference, for instance, or it is simulated arithmetically. The comparison takes place at time-discrete intervals, that is to say, from time to time. In the event that the controlled variable changes between two instants by an amount that is greater than a specified limit value, interference is detected and the control parameters of the controller, for instance, are reset. As an alternative, it is also possible, for example, to reduce the amplification in the control circuit by adapting the control parameters, or the two measures are combined. The comparison with the limit value, which is settable or also specified in advance, may be performed by comparing the numbers; another option consists of utilizing an overflow indicator internal to the arithmetic logic unit. The triggering of this response may take place either inside the control circuit or by analyzing a trigger signal such as a digital flag; it is also possible to trigger the response in that the control circuit generates an analog voltage. The analysis of the trigger signal may be performed by an external microcomputer, for example, which then resets or configures the evaluation circuit accordingly. However, the microcomputer may also be part of the control unit.

Due to these measures, the actuating variable, i.e., the useful signal, becomes invalid for a short period of time, if possible, and, in the ideal case, for the duration of the interference. One to two computation cycles after the interference has abated, the useful signal is once again able to be determined in an unfalsified manner. The invalid values of the useful signals may be marked by a flag, for instance, and are no longer considered in the further analysis.

The afore-described method is implementable as a computer program, so that it is able to be retrofitted in existing control units. In principle, it is also possible to realize the method by an analog control circuit.

What is claimed is:

1. A method for suppressing interference in a controlled variable in a control circuit, in which an actuating variable is a useful signal, the method comprising:
   detecting the controlled variable continuously, at two successive sampling instants in each case;
   subtracting a controlled value of the controlled variable obtained during the detecting at a second sampling instant from the controlled value of the controlled variable obtained during the detecting at a first sampling instant; and
   modifying at least one control parameter when an absolute amount of a difference deviates by a predefinable setpoint value, wherein the modification is done in such a way that a response of the actuating variable to the interference is minimized, wherein the useful signal is flagged as invalid during a duration of the interference so that the flagged useful signal is not considered for determining the controlled variable, and upon abatement of the interference signal for a predetermined number of computation cycles, the useful signal is determined in an unfalsified manner, wherein the useful signal is a pumping current.

2. The method according to claim 1, wherein the useful signal is not used during a modification of the at least one control parameter.

3. The method according to claim 1, wherein all control parameters are reset to their initial values.

4. The method according to claim 1, wherein an amplification in the control circuit is reduced by modifying the at least one control parameter.

5. The method according to claim 1, wherein a comparison takes place at time-discrete intervals.

6. The method according to claim 1, wherein the actuating variable is a pump current of a regulated Lambda probe.

7. A non-transitory computer-readable medium containing a computer program which when executed by a processor performs the following method for suppressing interference in a controlled variable in a control circuit, in which an actuating variable is a useful signal:
   detecting the controlled variable continuously, at two successive sampling instants in each case;
   subtracting a controlled value of the controlled variable obtained during the detecting at a second sampling instant from the controlled value of the controlled variable obtained during the detecting at a first sampling instant; and
   modifying at least one control parameter when an absolute amount of a difference deviates by a predefinable setpoint value, wherein the modification is done in such a way that a response of the actuating variable to the interference is minimized, wherein the useful signal is flagged as invalid during a duration of the interference so that the flagged useful signal is not considered for determining the controlled variable, and upon abatement of the interference signal for a predetermined number of computation cycles, the useful signal is determined in an unfalsified manner, wherein the useful signal is a pumping current.

* * * * *